US008483888B2

(12) United States Patent
Boileau et al.

(10) Patent No.: US 8,483,888 B2
(45) Date of Patent: Jul. 9, 2013

(54) EMERGENCY COMMUNICATIONS CHANNEL SYSTEMS AND METHODS FOR SATELLITE COMMAND

(75) Inventors: Steven I. Boileau, Leesburg, VA (US); Bruce Pressley Voris, Elkridge, MD (US); Christopher Owen Kearney, Leesburg, VA (US); Michael Lee Schaeffer, Martinsburg, WV (US)

(73) Assignee: Orbital Sciences Corporation, Dulles, VA (US)

( * ) Notice: Subject to any disclaimer, the term of this patent is extended or adjusted under 35 U.S.C. 154(b) by 0 days.

(21) Appl. No.: 13/438,377

(22) Filed: Apr. 3, 2012

(65) Prior Publication Data

US 2012/0259485 A1   Oct. 11, 2012

Related U.S. Application Data

(60) Provisional application No. 61/472,459, filed on Apr. 6, 2011.

(51) Int. Cl.
*G05D 1/00* (2006.01)

(52) U.S. Cl.
USPC .......................................................... 701/3

(58) Field of Classification Search
USPC .......................................................... 701/3
See application file for complete search history.

(56) References Cited

U.S. PATENT DOCUMENTS

| | | | |
|---|---|---|---|
| 4,809,006 A | | 2/1989 | Dar |
| 5,271,582 A | | 12/1993 | Perkins et al. |
| 5,966,640 A | * | 10/1999 | Leath et al. ................. 455/12.1 |
| 6,252,544 B1 | * | 6/2001 | Hoffberg ................. 342/357.31 |
| 6,298,289 B1 | * | 10/2001 | Lloyd et al. ..................... 701/13 |
| 6,735,501 B1 | | 5/2004 | Rulison et al. |
| 7,542,829 B2 | | 6/2009 | Lee et al. |
| 7,756,517 B2 | * | 7/2010 | Kim et al. ..................... 455/427 |
| 7,856,294 B2 | * | 12/2010 | Van Gaasbeck et al. ......... 701/3 |
| 7,991,518 B2 | * | 8/2011 | Kim et al. ..................... 701/13 |
| 8,094,731 B2 | * | 1/2012 | Ray et al. ..................... 375/259 |
| 8,208,891 B2 | * | 6/2012 | Jacobs et al. ............... 455/404.1 |
| 8,260,551 B2 | * | 9/2012 | Janky et al. ................... 701/469 |
| 2003/0055590 A1 | | 3/2003 | Park et al. |
| 2005/0060070 A1 | * | 3/2005 | Kapolka et al. ................. 701/29 |
| 2008/0082222 A1 | * | 4/2008 | Kim et al. ........................ 701/3 |
| 2008/0268838 A1 | * | 10/2008 | Zufall et al. ................. 455/430 |
| 2009/0015466 A1 | | 1/2009 | Kim et al. |
| 2009/0052369 A1 | * | 2/2009 | Atkinson et al. ............. 370/316 |

OTHER PUBLICATIONS

International Search Report and Written Opinion dated Oct. 4, 2012, International Application No. PCT/US2012/032114 8 pages.

* cited by examiner

*Primary Examiner* — Thomas Tarcza
*Assistant Examiner* — Alex C Dunn
(74) *Attorney, Agent, or Firm* — Ropes & Gray LLP

(57) ABSTRACT

Systems and methods for commanding a satellite are provided. A system for commanding a satellite includes a data bus and a payload coupled to the data bus, the payload including a payload receiver. The system further includes a primary receiver coupled to the data bus and a processor coupled to the data bus. The processor configured to receive a first command from the primary receiver via the data bus, and to receive telemetry data from the payload via the data bus. The processor is further configured to detect a second command by processing the telemetry data received from the payload, and to execute the detected second command.

30 Claims, 8 Drawing Sheets

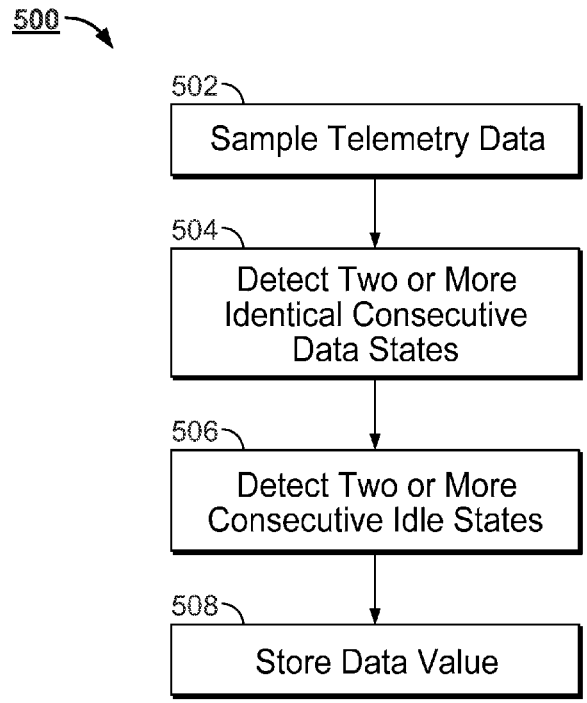

EMERGENCY COMMUNICATIONS CHANNEL SYSTEMS AND METHODS FOR SATELLITE COMMAND

CROSS REFERENCE TO RELATED APPLICATION

This disclosure claims the benefit of U.S. Provisional Application No. 61/472,459, filed Apr. 6, 2011, which is hereby incorporated by reference herein in its entirety.

BACKGROUND OF THE INVENTION

The present invention relates to satellite command systems and methods, and more particularly, to a satellite command system that enables commanding of a satellite by remotely modulating telemetry data parameters indicative of the operation of one or more of the satellite's payloads.

Systems and methods for commanding in-orbit satellites from a ground station are well known in the art. During normal operation, the ground station sends commands to the satellite. The commands are received by the satellite's communication subsystems, which include a primary receiver, and are sent to the satellite's flight computer for execution. However, a failure within one or more of the satellite's communication subsystems may leave the satellite unable to receive commands from the ground station, but otherwise functional. Accordingly, there is a need for backup systems and methods for transmitting commands to the satellite, wherein the backup methods are robust to communication subsystem failures.

SUMMARY OF THE INVENTION

To address the above and other shortcomings within the art, an Emergency Communications Channels (ECC) satellite command system according to one aspect of invention enables commanding of a satellite by remotely modulating telemetry data parameters indicative of the operation of one or more of the satellite's payloads by modulating signals sent directly to the payload from a ground station.

The ECC system includes software and hardware within the satellite's flight computer, and software and hardware implemented within a ground station. The satellite portion of the ECC system includes a data bus, and one or more payloads coupled to the data bus. Each of the payloads includes a payload transponder (which may provide both receiver and transmitter functions). The satellite portion of the ECC system further includes a primary receiver coupled to the data bus, and a processor coupled to the data bus. The processor is configured to receive a first command from the primary receiver via the data bus. The processor is further configured to receive telemetry data from the payload via the data bus. The processor is further configured to detect a second command by processing the telemetry data received from the payload. When the second command is detected, the processor is configured to execute the detected second command. Advantageously, this system for commanding a satellite does not require using the primary receiver to receive the second command, or require additional communication pathways parallel to the data bus.

In some embodiments, the processor is configured to detect an absence of commands from the primary receiver. The processor processes the telemetry data to detect the second command in response to the absence of commands from the primary receiver. In some embodiments, the absence of commands from the primary receiver can include the absence of commands from the primary receiver for a predetermined amount of time. In some embodiments, the predetermined amount of time is configurable.

In some embodiments, the processor is configured to process a parameter of the telemetry data to detect the second command. The processor detects the second command by detecting changes in the parameter of the telemetry data of the payload, and interprets the detected changes as data bits. In some embodiments, detecting changes in the parameter of the telemetry data includes detecting changes in the amount of power drawn by the payload transponder. In some embodiments, the processor detects the second command using a signaling process that is self-clocking, and is substantially independent of time. In some embodiments, the processor detects the second command based on detecting a predetermined preamble sequence.

In some embodiments, the processor is configured to acknowledge the execution of the detected second command by muting the payload transponder for a predetermined amount of time. According to some embodiments, the predetermined amount of time is configurable.

According to another aspect, the invention relates to a method, and a non-transitory computer readable media storing instructions, which, when executed by a processor, cause the processor to carry out a method for, commanding a satellite. The method includes receiving, with a processor, a first command from a primary receiver via a data bus, receiving telemetry data from a payload via the data bus, and detecting a second command by processing the telemetry data received from the payload. The method further includes executing the detected second command.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 5 shows an exemplary method for detecting command data values in accordance with an embodiment of the present invention.

FIG. 6 shows an exemplary format of an ECC command frame in accordance with an embodiment of the present invention.

DETAILED DESCRIPTION

To provide an overall understanding of the invention, certain illustrative embodiments will now be described. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
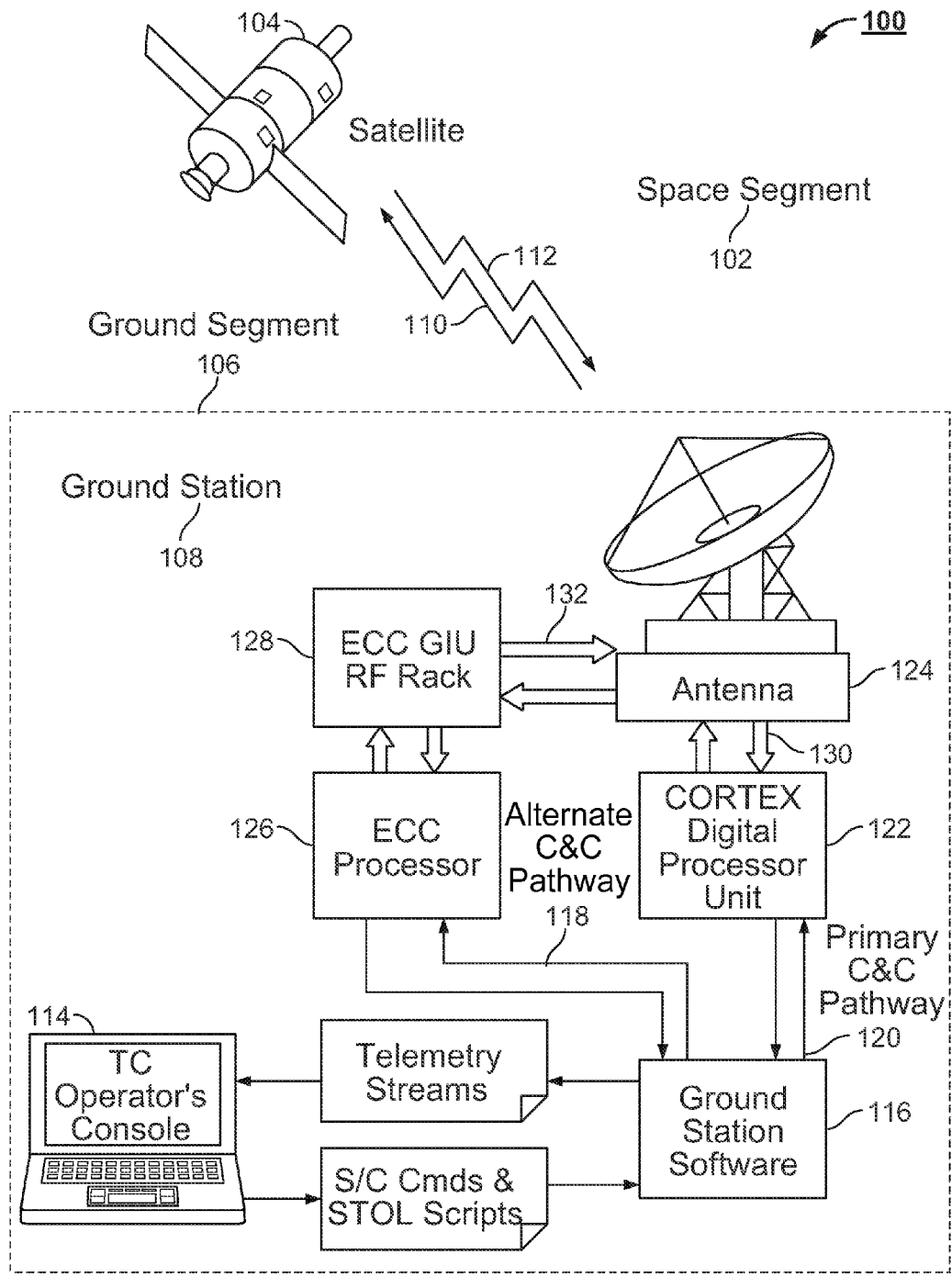
FIG. 1 shows an exemplary satellite command system including the ECC system in accordance with an embodiment of the present invention.

FIG. 1 illustrates an exemplary satellite command system 100 including the ECC system according to the present invention. The satellite command system 100 includes a space segment 102 including a satellite 104 and a ground segment 106 including a ground station 108. The ground station 108 includes hardware and software for communicating with the satellite 104 via uplink channels 110 and downlink channels 112. The ground station 108 according to the present invention may communicate with multiple satellites, although only one satellite 104 is shown for simplicity. Data transmitted to the satellite 104 via the uplink channel 110 can include commands for the satellite 104, and the data received from the satellite 104 via the downlink channel 112 can include telemetry data from the satellite 104. During normal operation, ground station software 116 uses a primary ground segment to space segment command and communications pathway 120 (the "primary command pathway"). The primary command pathway 120 includes the ground station software 116, digital processor unit (DPU) 122, interface 130, ground station equipment 124, the uplink 110 and downlink 112 channels, and various subsystems of the satellite 104. The ground station software 116 first receives commands destined for the satellite 104. These commands may be generated by the ground station software 116 itself, input at an operator's console 114, or received from other sources. The ground station software 116 processes these commands, converting them to the appropriate format recognizable by the satellite 104. In one embodiment, the ground station software 116 uses a protocol such as the Star-2 Synchronous Data Link Control (SDLC) protocol to communicate with the satellite 104. Transmitting commands according to the SDLC protocol includes transmitting SDLC command frames. The ground station software 116 generates the command frames, and then transmits the command frames to the Digital Processor Unit (DPU) 122. The DPU 122 converts the command frames into signals. In one embodiment, the signals are intermediate frequency signals. In another embodiment, the signals include a carrier signal. The signals are transmitted by the DPU across the interface 130 to the ground station radio frequency (RF) equipment 124, which then transmits them to the satellite 104 as RF signals.

FIG. 1 further illustrates an alternate ground segment to space segment command and communications pathway 118 used by the ECC system 100 (the "alternate command pathway"). The alternate command pathway 118 includes the ground station software 116, ECC processor 126, ECC ground interface unit (GIU) rack 128, interface 132, the ground station equipment 124, the uplink 110 and downlink 112 channels, and various subsystems of the satellite 104. In one embodiment, the alternate command pathway 118 may be used in an emergency situation, when there is a fault or failure within the primary command pathway 120. According to this embodiment, if a fault in the primary command pathway 120 is detected, the ground station software 116 may instead transmit the received commands to the ECC processor 126. In another embodiment, the alternate command pathway 118 may be used while the normal command pathway 120 is operable. When the alternate command pathway 118 is used, the ECC processor 126 translates the SDLC command frame into an ECC command frame, and forwards it to the ECC ground interface unit (GIU) rack 128. The GIU rack 128 generates signals corresponding to ECC command frame. In one embodiment, GUI rack 128 generates the signals corresponding to ECC command frame by modulating a carrier signal. The GIU rack 128 forwards the generated signals to the ground station equipment 124 for transmission to the satellite 104.

Figure 2:
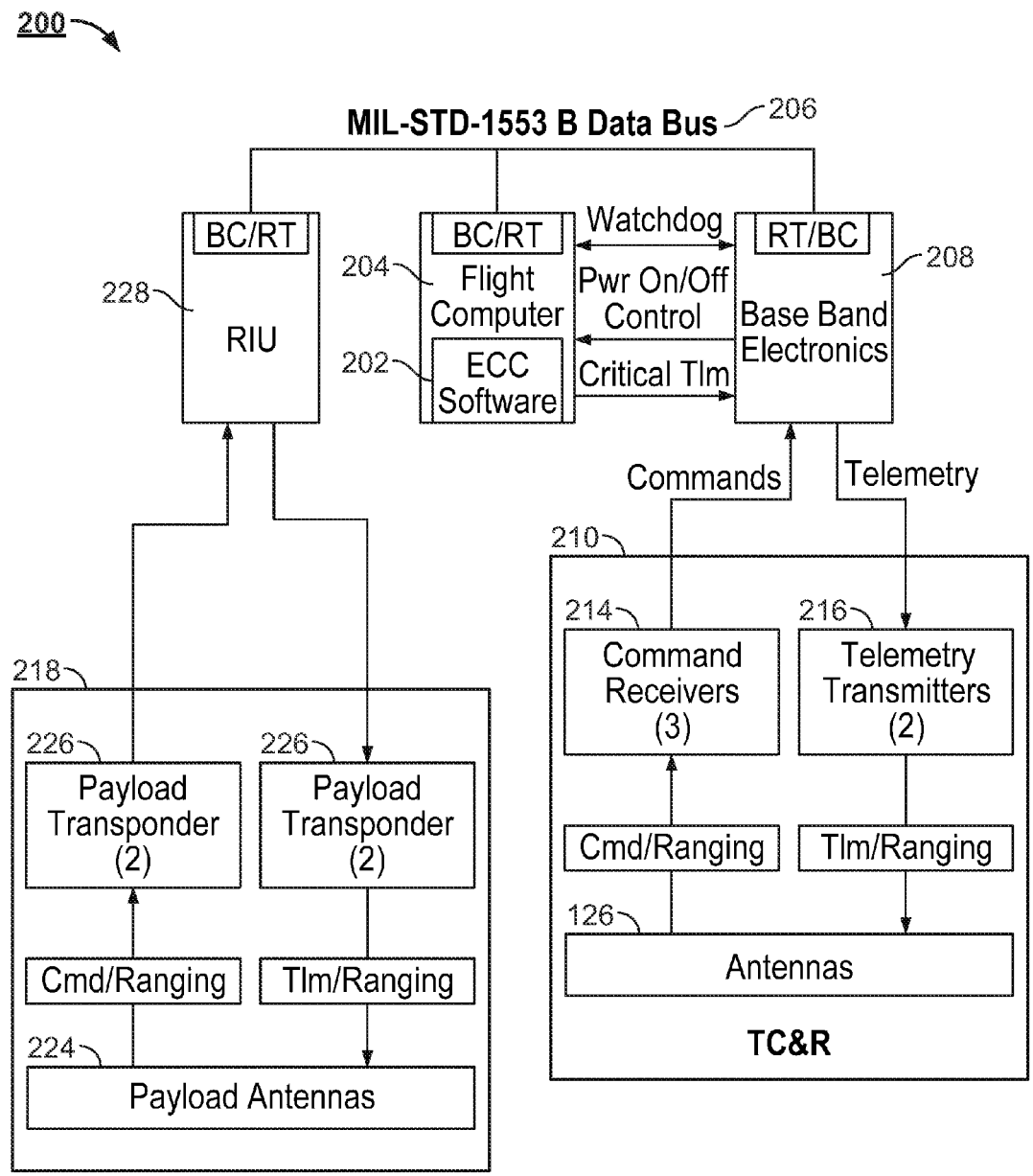
FIG. 2 shows the subsystems of an exemplary in-orbit satellite including ECC software in accordance with an embodiment of the present invention.

FIG. 2 illustrates subsystems 200 of an exemplary in-orbit satellite 104 including ECC software 202 according to the present invention. The satellite subsystems 200 include a flight computer 204 coupled to a data bus 206 such as the MIL-STD-1553 B data bus. In one embodiment, communications over the data bus 206 are direct memory access (DMA) communications. According to the present invention, the satellite subsystems 200 may include multiple redundant flight computers, although only one flight computer 204 is shown for simplicity. The flight computer 204 is coupled to the baseband electronics (BBE) subsystem 208 via the data bus 206. The BBE subsystem 208 is in turn coupled to the telemetry, control, and ranging (TC&R) subsystem 210.

The TC&R subsystem 210 includes a plurality of antennas and one or more command receivers 214. The command receivers 214 are used to receive and demodulate data, including commands, from the ground station 108 received on the uplink channels 110. The TC&R subsystem 210 further includes one or more telemetry transmitters 216 which are used to transmit data, including telemetry and ranging data, to the ground station 108 on the downlink channels 112. In one embodiment, the data is provided by the flight computer 204.

The baseband electronics (BBE) subsystem 208 is configured to receive the demodulated commands from the TC&R subsystem 210, decrypt the commands and forward the commands to the flight computer 204 or other satellite subsystems using the data bus 206. The flight computer 204 receives and processes the commands. In one embodiment, the flight computer executes the commands. In another embodiment, the flight computer validates the commands and forwards the validated commands to other satellite subsystems for subsequent execution.

The satellite subsystem 200 further includes one or more payloads coupled to the data bus 206. For simplicity, only a single payload 218 is illustrated in FIG. 2. In one embodiment, the payload 218 is a communications system, such as a Ku-Band broadcast communication system. The payload includes one or more antennas 224 and one or more payload transponders 226. The payload transponders 226 can communicate with the ground station 108 by receiving data including RF signals on the uplink channels 110. The payload transponders 226 can further communicate with the ground station 108 by transmitting data including RF signals on the downlink channels 112. In one embodiment, the payload transponders 226 receive communications signals from a first ground station, and the payload transponders 226 broadcast the communications signals to a second ground station.

The flight computer 204 can communicate with the payload 218 by sending data to the remote interface unit (RIU) 228 and receiving data from the RIU 228. In one embodiment, the flight computer 204 can only communicate with the payload 218 by communicating with the RIU 228. In this embodiment, RIU 228 isolates the payload 218 from direct communication with other satellite subsystems by acting as an interface between the payload 218 and the other satellite subsystems. The flight computer 204 can send various commands to control elements within the payload 218. These commands can include activating or deactivating various payload elements, such as the payload transponders 226. The flight computer 204 can also request telemetry data from the payload elements. In one embodiment, the payload elements from which telemetry data can be requested include the payload transponders 226. The telemetry data includes a plurality of telemetry data parameters. In yet another embodiment, telemetry data parameters include the amount of power drawn by the payload transponders 226.

The ECC command system 100 according to the present invention includes ECC software 202 stored in the memory of the flight computer 204. In one embodiment, the ECC software 202 is stored in the electrically erasable programmable read only memory (EEPROM) of the flight computer 204. In this embodiment, the ECC software 202 is automatically transferred to random access memory (RAM) of the flight computer 204 prior to execution, and is stored in RAM during execution along with associated system variables and data. In another embodiment, the ECC software 202 is loaded directly to the RAM of the flight computer 204 via a RAM patch load, during which data, including the ECC software 202, is sent to the satellite by the ground station 108. In this embodiment, the ECC software 202 becomes active upon completion of the RAM patch load.

In one embodiment, the ECC software 202 includes stored parameters which associate two of the transponders 226 with primary and secondary ECC channels. The primary and secondary ECC channels are used by the ECC software 202 to communicate with the ground station 108. The primary and secondary ECC channels are each associated with one of the payload transponders 226. In another embodiment, the stored parameters include each transponder's RIU 228 address and commands for requesting appropriate telemetry data.

Figure 3:
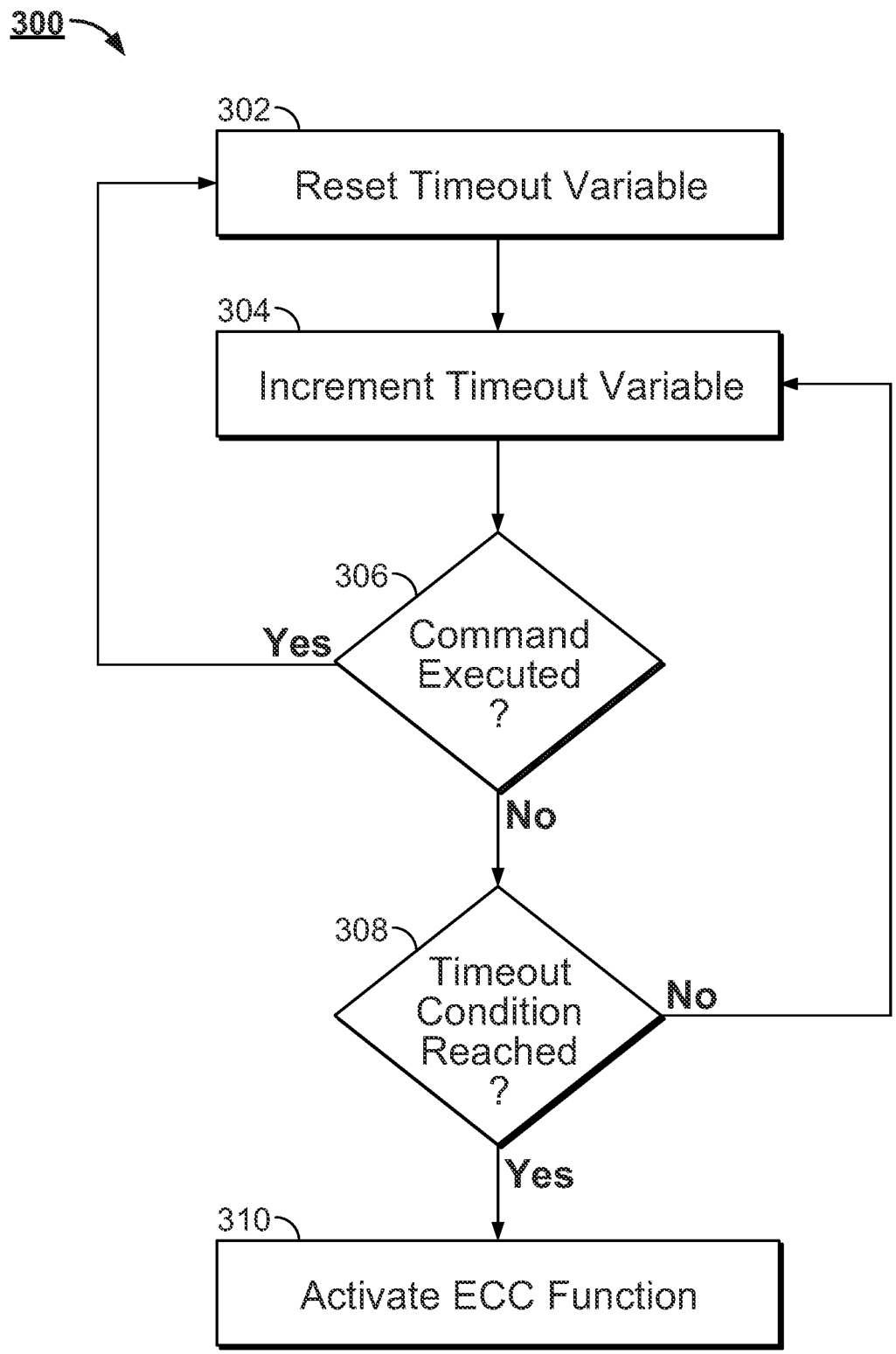
FIG. 3 shows an illustrative ECC system startup and initialization procedure in accordance with an embodiment of the present invention.

FIG. 3 shows the ECC system startup and initialization procedure 300, implemented by the ECC software 202, according to the present invention. The ECC software 202 monitors the commands executed by the flight computer 204. The monitoring may be done by maintaining a timeout variable which indicates the amount of time which has passed since the last command has been executed by the flight computer 204. At 302, the ECC software 202 initializes the timeout variable. At 304, the ECC software 202 increments the timeout variable after a predetermined period of time. At 306, the ECC software 202 checks whether a command has been executed by the flight computer 204. Each time a command is executed by the flight computer 204, the ECC software 202 returns to 302 and the timeout variable is reset. At 308, ECC software 202 checks if the timeout variable has reached a certain threshold value, indicating a timeout condition. The timeout condition indicates that a threshold amount of time has passed since a command has been executed by the flight computer 204. If the timeout condition occurs, the ECC software 202 activates its emergency communications (EC) function at 310. In one embodiment, the EC function may be activated manually by setting the timeout variable to the threshold value via a direct memory poke. In one embodiment, the ECC feature can be enabled or disabled via a direct memory poke.

When the EC function of the ECC software 202 running on the flight computer 204 is activated, the ECC software 202 begins monitoring changes in telemetry data parameters associated with the primary and secondary ECC channels. In one embodiment, changes in telemetry data parameters are related to the changes in the RF carrier level introduced by the GIU 128 software into the RF signal transmitted by the ground station 108. In another embodiment, these changes are associated with various signaling schemes and transmission schemes for transmitting data and commands from the ground station portion 108 of the ECC system 100 to the satellite portion 104 of the ECC system 100. In yet another embodiment, these changes include changes in the amount of power drawn by elements of the payload 218, such as the payload transponders 226.

Figure 4A:
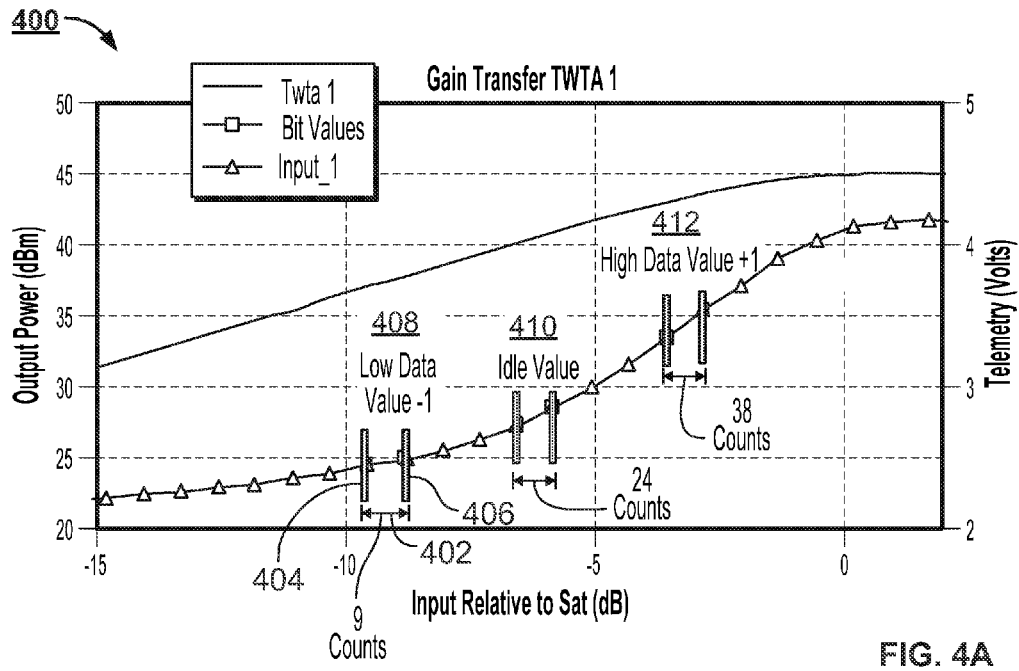
FIG. 4A shows an exemplary scheme for varying telemetry data parameters to transmit command data in accordance with an embodiment of the present invention.
Figure 4B:
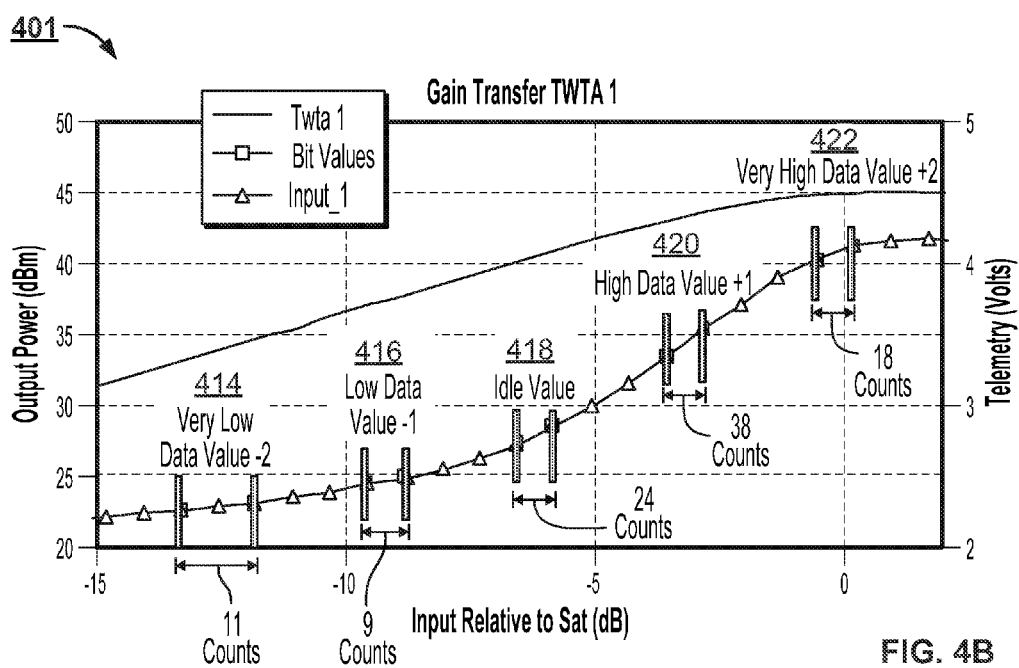
FIG. 4B shows another exemplary scheme for varying telemetry data parameters to transmit command data in accordance with an embodiment of the present invention.

FIGS. 4a and 4b show exemplary schemes 400 and 401 for varying telemetry data parameters to transmit command data. In one embodiment, the data may be encoded by designating different ranges of values of a telemetry data parameter as different states. Each range of values is defined by a minimum and a maximum threshold. For example, the range of values 402 has a minimum threshold 404 and a maximum threshold 406. The number of different states varies according to the particular transmission scheme. In the exemplary signaling scheme 400 shown in FIG. 4A, three ranges of values corresponding to a Low data state 408, an Idle state 410, and a High data state 412 are used to encode binary data values—a binary '0' and a binary '1'. In the exemplary scheme 401 shown in FIG. 4B, five ranges of values corresponding to a Very Low data state 414, a Low data state 416, an Idle state 418, a High data state 420, and a Very High data state 422 are used to encode two-bit binary blocks of data values corresponding to '00', '01', '10', and '11'. In both exemplary schemes, the Idle states 410 and 418 are used to latch the output data value or data value block. Further schemes may use a higher number of states to permit a wide variety of possible encoding schemes. In one embodiment the data values are coded using Return to Zero Coding.

FIG. 5 shows an exemplary method for detecting command data values according to the present invention. At 502, the ECC software 202 samples telemetry data parameters associated with the primary or secondary ECC channel at predetermined intervals. In one embodiment, interval at which the ECC software 202 samples the telemetry data from the chosen channel is configurable. At 504, the ECC software 202 continues sampling the channel until it detects two or more consecutive values of the telemetry data parameter within the range of values corresponding to the same data state. If at 506 the ECC software 202 detects that the two or more same data states are followed immediately by two or more consecutive values of the telemetry data parameter corresponding to an Idle state, the ECC software 202 deems that the transmitted data value corresponding to two or more same data states is valid. When the value is deemed valid, the ECC software 202 stores it for further processing at 508. Otherwise, the ECC software 202 returns to 502 and restarts sampling the telemetry data.

Because the signaling process described above may include a plurality of consecutive same data states and a plurality of consecutive Idle states which may last over a variable number of sample periods, the signaling process is self-clocking, and is substantially independent of time. Because the data value detection method 500 makes allowances for a plurality of consecutive same data states and a plurality of consecutive Idle states which may last over a variable number of sample periods, the data value detection method 500 is also self-clocking, and is also substantially independent of time.

A sequence of valid data values makes up an ECC command frame. FIG. 6 shows an exemplary format of an ECC command frame 600. The exemplary ECC command frame 600 is 17 bytes long.

The first field is a 1 byte Sync Byte field 602. In one embodiment, the Sync Byte field 602 is used to identify the start of the ECC command frame. In another embodiment, the Sync Byte field 602 is used for calibrating the ranges of values of a telemetry data parameter that correspond to the different states used in a communication scheme. In this embodiment, the Sync Byte field 602 encodes a predetermined sequence of states. In the case of the three-state signaling scheme 400 shown in FIG. 4A, the Sync Byte field 602 can include every state used in signaling, i.e. the Low data state 208, the Idle State 410 and the High data state 412. In the case of the five-state signaling scheme 401 shown in FIG. 4B, the Sync Byte field 602 can include every state used in signaling, i.e. the Very Low data state 414 the Low data state 416, the Idle State 418, the High data state 420, and the Very high data state 422. By comparing the signal levels in a Sync Byte field 602 of a received ECC command frame to the to the predetermined sequence of states which are known to be encoded by the Sync Byte field 602, the ECC software 202 can adjust the ranges of values which correspond to the respective states. Advantageously, this 'auto-calibration' process allows the ECC software 202 to compensate for changes in the communication path between ground station 108 and the satellite 104 without communicating with the ground station 108.

The Sync byte field 602 is followed by a 1 byte Spacecraft ID field 604, which is used to uniquely identify the particular satellite 104 the ECC command frame 600 is being transmitted to. In one embodiment, the Spacecraft ID field 604 includes an SDLC frame address or Satellite Address specified by the standard SDLC command format.

The Spacecraft ID field 604 is followed by a 1 byte OpCode field 606. Codes included in the OpCode field 606 are used to specify a top level operation to be performed in association with the ECC command 600. In one embodiment, the codes included in the OpCode field 606 may be in the standard Command Block Op-Code format, and may be identical in format to standard codes transmitted to the satellite 104 during normal operation, such as codes specified by the SDLC protocol. In another embodiment, the codes included in the Opcode field 606 are abbreviated, and are smaller in length than the standard codes. In this embodiment, each of the abbreviated codes which can be included in the Opcode field 606 is associated with a unique standard code stored in a database accessible by the ECC software 202. When processing the ECC command frame 600, ECC software 202 determines the standard code based on the abbreviated code included in Opcode field 606.

The OpCode field 606 is followed by a 12 byte Data Words field 608. In one embodiment, the data words included in the Data Words field 608 may be identical in format to those transmitted to the satellite during normal operation, such as data words specified by the SDLC protocol.

The Data Words field 608 is followed by a 2 byte Cyclic Redundancy Check (CRC) field 610. The data included in the CRC field 610 is used to detect errors introduced into the received ECC command frame 600 during the transmission process. In one embodiment, the CRC code for the ECC command frame 600 is calculated using the CRC polynomial "$X^{16}+X^{12}+X^5+1$" according to methods well known in the art. The CRC is calculated starting from the Spacecraft ID field 604.

Figure 7A:
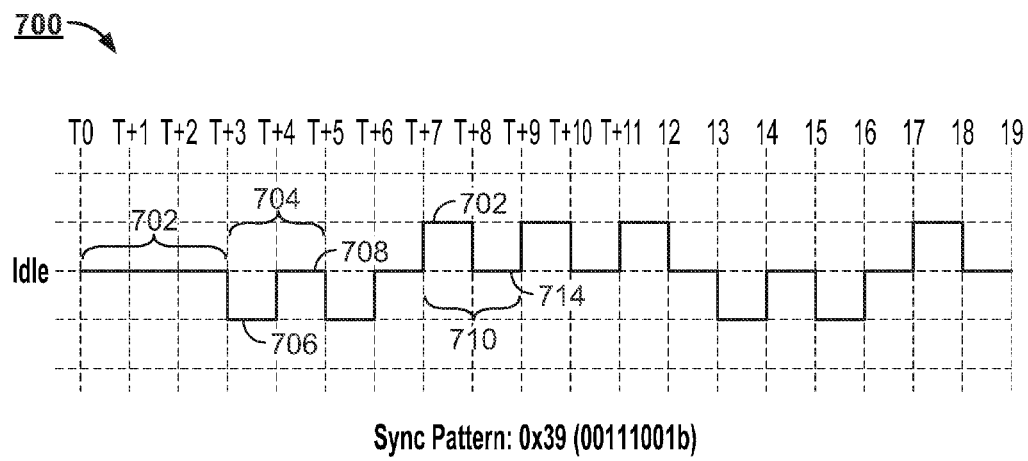
FIG. 7A shows an illustrative preamble pattern in accordance with an embodiment of the present invention.
Figure 7B:
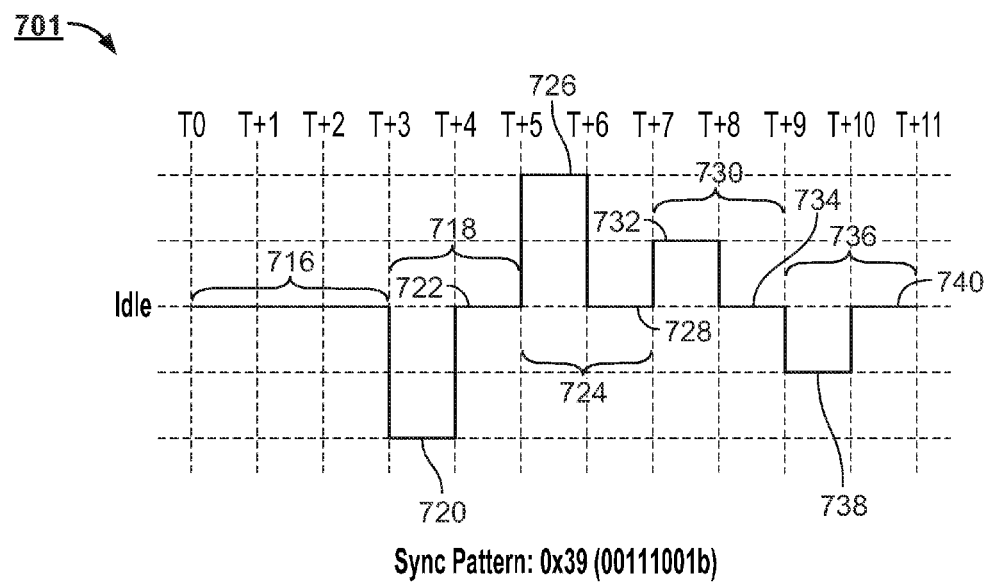
FIG. 7B shows another illustrative preamble pattern in accordance with an embodiment of the present invention.

FIGS. 7a and 7b illustrate exemplary preamble patterns 700 and 701 included in the Synch Byte field 602 of the ECC command frame 600. The preamble patterns such as 700 and 701 are used to designate the start of an ECC command frame 600.

FIG. 7A illustrates an exemplary pattern 700 of data values which can be used in conjunction with the exemplary three-state signaling scheme 400 shown in FIG. 4A. The pattern 700 consists of a succession of Idle states 702, sequences such as 704 of Low data states 706 followed by Idle states 708, each sequence 704 corresponding to a valid '0' data value, and sequences such as 710 of High data states 712 followed by Idle states 714, each sequence 710 corresponding to a valid '1' data value. In one embodiment, the data values encode a unique constant used to identify the ECC command frame 600, for example '0x39' in hexadecimal format which corresponds to '001110001' in binary format. In another embodiment, the constant used to identify the ECC command frame 600 is configurable.

FIG. 7B illustrates an exemplary pattern of data values 701 which can be used in conjunction with the exemplary five-state signaling scheme 401 shown in FIG. 4B. The pattern 701 consists of a succession of Idle states 716, a sequence 718 of Very Low data states 720 followed by Idle states 722, a sequence 724 of Very High data states 726 followed by Idle states 728, a sequence 730 of High data states 732 followed by Idle states 734, and a sequence 736 of Low data states 738 followed by Idle states 740, each data state corresponding to one of '00', '01', '10', and '11' valid binary data value blocks.

Although the exemplary data value detection method 500 according to the present invention is substantially independent of time, a maximum command data rate for an exemplary detection method may be computed. The following calculations are shown for illustrative purposes only, and not meant to constrain the present invention to the described embodiments.

In one embodiment, the ECC software 202 samples the telemetry data from the chosen channel at 16 times per second. According to exemplary method 500 for detecting command data values, the ECC software 202 must detect at least two consecutive states corresponding to two identical data values, followed by at least two consecutive states corresponding to two Idle values. Thus, the ECC software 202 needs at least four sample periods, corresponding to one quarter of one second, to detect a single valid data value corresponding to either a binary data bit or a binary data block. If the three-state signaling scheme 400 shown in FIG. 4A is used, the ECC software 202 may detect one valid bit every quarter of a second. Since the exemplary ECC command frame 600 is 17 bytes long, the ECC software 202 can at a maximum detect one command every 34 seconds. If the five state signaling scheme 401 shown in FIG. 4A is used, the ECC software 202 may detect two valid bits every quarter of a second. Since an exemplary ECC command frame 600 is 17 bytes long, the ECC software 202 can at a maximum detect one command every 17 seconds. The sending of an acknowledgement by the ECC software 202, which will be described in more detail below, may add a further amount of time to the time necessary to receive one command, and may accordingly lower the effective command data rate.

When the ECC software 202 detects a valid and complete ECC command frame 600 according to, for example, process 500, the ECC software 202 forwards the command to a command processor of the flight computer 204, which processes the command. The command processor of the flight computer 204 can process the command by executing it, or by forwarding it to other subsystems of the satellite 104 for execution. Upon successful execution of the command, the command processor provides an indication of the successful execution to the ECC software 202. Upon receiving the indication, the ECC software 202 may acknowledge the successful execution by communicating with the ground station 108.

Figure 9:
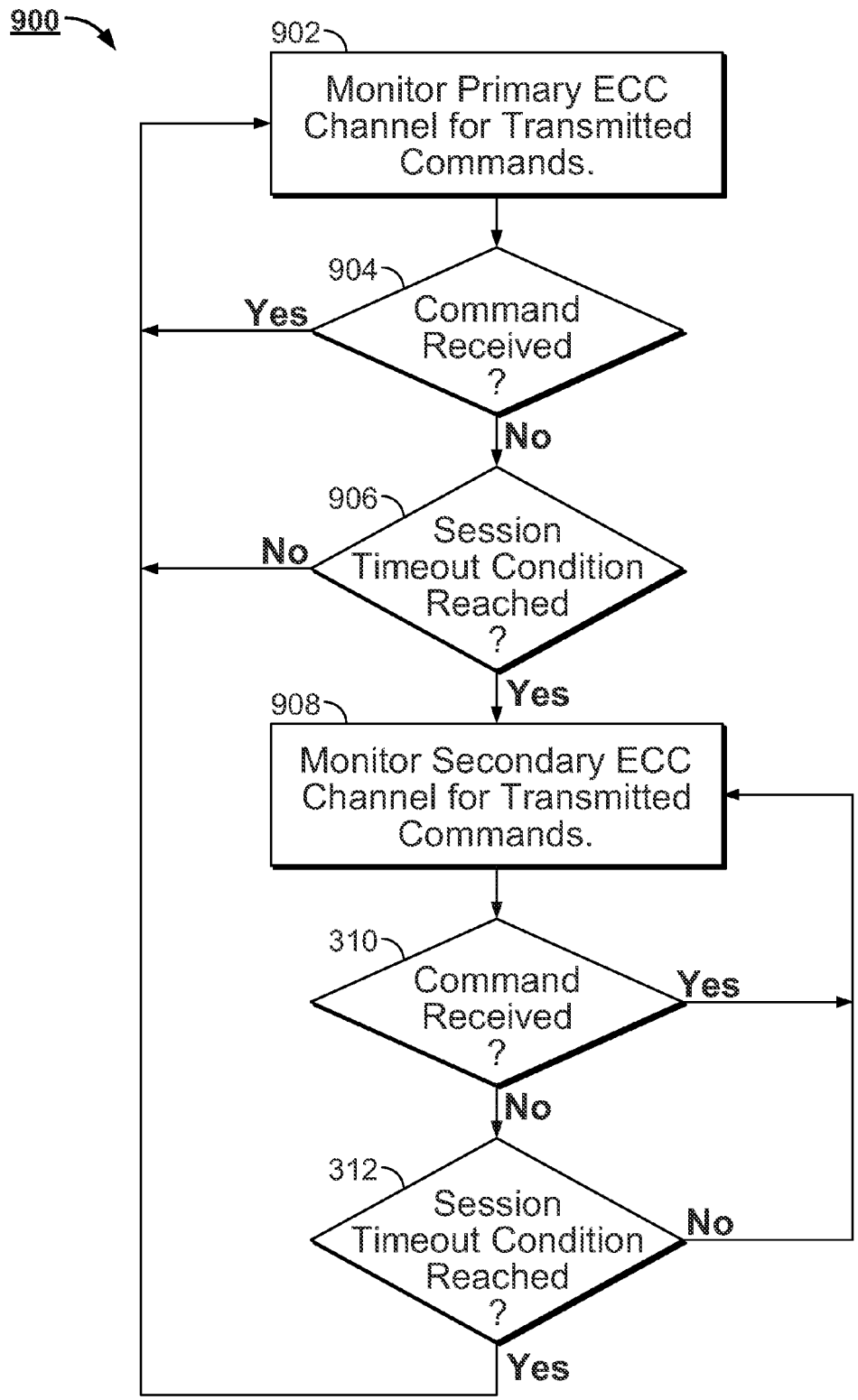
FIG. 9 shows an exemplary command channel search method in accordance with an embodiment of the present invention.

FIG. 9 shows an exemplary acknowledgement method 800 according to an embodiment of the present invention. At 802, upon receiving an indication of the successful execution of a command, the ECC software 202 sends a command to the RIU 228 to mute the primary or secondary ECC channel, causing loss of a carrier signal sent by the downlink payload transponder 226 associated with the primary or secondary ECC channel. At 804, after a predetermined amount of time, the ECC software 202 sends another command which unmutes the channel. At 806, the ECC software 202 then resumes processing telemetry data for included ECC command frames 600 according to, for example, method 500. In one embodiment, the predetermined amount of time is one half of one second. In another embodiment, the predetermined amount of time is configurable. When the ECC processor 126 at the ground station 108 detects the loss of the carrier from the payload transponder 226 and the reappearance of the carrier after a predetermined period of time, the ECC processor 126 recognizes the acknowledgement of successful command execution sent by the ECC software 202. The ECC processor 126 then sends further commands as needed.

FIG. 9 shows an exemplary search procedure 900 according to the present invention, which the ECC software 202 may use in determining whether to monitor the primary ECC channel or the secondary ECC channel. Upon activation of the EC function, the ECC software 202 enters the procedure 900 at 902. At 902, the ECC software 202 begins monitoring the primary ECC channel for transmitted commands. At 904, if a command is detected, the ECC software 202 returns to 902. At 904, if a command is not detected within a predetermined period of time, for example 24 hours, a first session timeout condition is declared. When the first session timeout condition is declared, the ECC software switches from the primary ECC channel to the secondary ECC channel, and begins monitoring the secondary ECC channel for transmitted commands at 908. At 910, if a command is detected, the ECC software 202 returns to 908. At 912, if a command is not detected within a predetermined period of time, for example 24 hours, a second session timeout condition is declared. When the second session timeout condition is declared, the ECC software switches from the secondary ECC channel back to the primary ECC channel, and begins monitoring the primary ECC channel for transmitted commands at 902.

According to one implementation of the present invention, the ECC software 202 communicates with the ground station 108 according to a default signaling scheme such as the three-state signaling scheme 400 illustrated in FIG. 4A. The ground station may command the ECC software 202 to communicate according to a new signaling scheme, such as the five-state signaling scheme 401 illustrated in FIG. 4B. If a session timeout condition occurs during the search procedure 900 at either at 904 or 912, the ECC software 202 reverts from the new signaling scheme to the default signaling scheme, then continues on to 906 or 902, respectively.

According to another implementation of the present invention, should either of the primary or the secondary ECC channels become unavailable, a new channel is designated in place of the unavailable channel by the ground station 108. Ground station 108 designates the new channel by associating a transponder 226 with the new channel.

Figure 8:
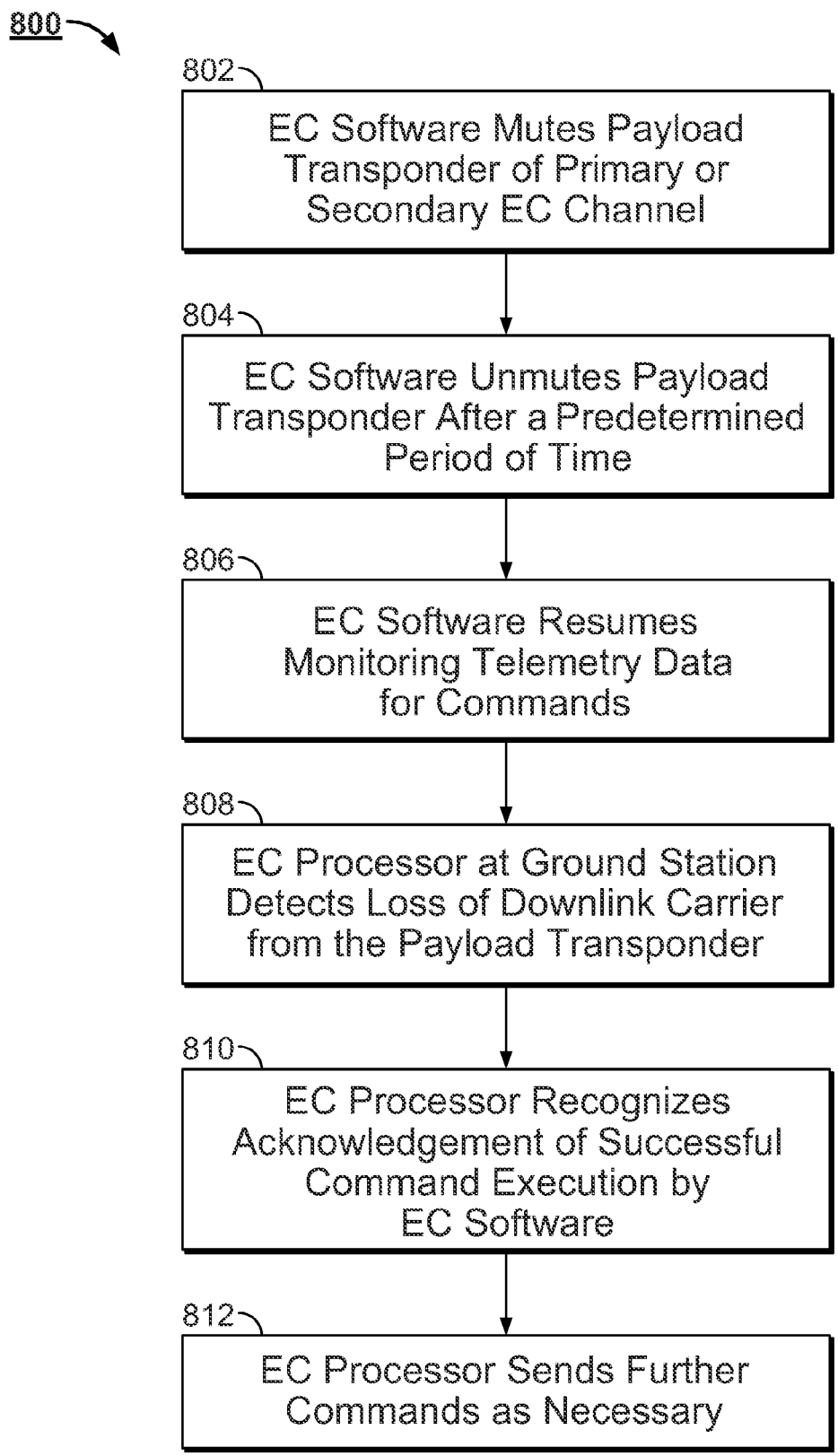
FIG. 8 shows an exemplary acknowledgement method in accordance with an embodiment of the present invention.

According to yet another implementation of the present invention, the ECC software 202 periodically sends status information to the ground station 108. The status information may include the signaling scheme according to which the ECC software 202 is currently communicating. The status information may also include the channel the ECC software 202 is currently using. The ECC software 202 may send the status information by repeatedly using the acknowledgement procedure 800 illustrated in FIG. 8. To send the status information, the ECC software 202 mutes the channel it is currently using a predetermined number of times and at periodic intervals. For example, the ECC software 202 mutes the channel two consecutive times to indicate to the ground station 108 that the ECC software 202 is currently using the primary ECC channel and the three-state transmission scheme 400. The ECC software 202 mutes the channel three consecutive times to indicate to the ground station 108 that the ECC software 202 is currently using the primary ECC channel and the five-state transmission scheme 401. The ECC software 202 mutes the channel four consecutive times to indicate to the ground station 108 that the ECC software 202 is currently using the secondary ECC channel and the three-state transmission scheme 401. Finally, the ECC software 202 mutes the channel five consecutive times to indicate to the ground station 108 that the ECC software 202 is currently using the secondary ECC channel and the five-state transmission scheme 401. Various similar schemes for transmitting status information to the ground station 108 may be used without departing from the spirit of the present invention.

The foregoing is merely illustrative of the principles of this invention and various modifications can be made by those skilled in the art without departing from the scope and spirit of the invention. The above described embodiments of the present invention are presented for purposes of illustration and not of limitation, and the present invention is limited only by the claims which follow.

What is claimed is:

1. A system for commanding a satellite, comprising:
a data bus;
   a payload coupled to the data bus, the payload comprising a payload receiver;
   a primary receiver coupled to the data bus;
   a processor coupled to the data bus, the processor configured to:
receive a first command from the primary receiver via the data bus;
receive telemetry data from the payload via the data bus;
detect a second command by processing the telemetry data received from the payload; and
execute the detected second command.

2. The system of claim 1, wherein:
the processor is configured to detect an absence of commands from the primary receiver; and
the processor detects the second command in response to detecting the absence of commands from the primary receiver.

3. The system of claim 2, wherein the absence of commands from the primary receiver comprises an absence of commands from the primary receiver for a predetermined amount of time.

4. The system of claim 3, wherein the predetermined amount of time is configurable.

5. The system of claim 1, wherein processing the telemetry data to detect the second command comprises detecting changes in a parameter of the telemetry data received from the payload and interpreting detected changes as data bits.

6. The system of claim 1, wherein detecting the second command comprises detecting changes in the amount of power drawn by the payload.

7. The system of claim 1, wherein:
the second command comprises a plurality of data bits, each of the plurality of data bits corresponding to a distinct state of a parameter of the telemetry data, and
detecting the second command comprises detecting each of the plurality of data bits associated with the second command, the detecting each of the plurality of data bits comprising:
 detecting a first bit value in response to detecting a first state of the parameter of the telemetry data followed by detecting a different state of the parameter of the telemetry data corresponding to an idle state, and
 detecting a second bit value in response to detecting a second state of the parameter of the telemetry data followed by detecting the different state of the parameter of the telemetry data corresponding to the idle state.

8. The system of claim 1, wherein:
the second command comprises a plurality of symbols, each of the plurality of symbols corresponding to a distinct state of a parameter of the telemetry data, and
detecting the second command comprises detecting each of the plurality of symbols corresponding to the second command, the detecting each of the plurality of symbols comprising:
detecting the distinct state of the parameter of the telemetry data corresponding to the each of the plurality of symbols, followed by detecting a different state of the parameter of the telemetry data corresponding to an idle state.

9. The system of claim 1, wherein detecting the second command comprises a signaling process that is substantially independent of time.

10. The system of claim 1, wherein the processor is further configured to acknowledge the execution of the detected second command by muting a payload transponder for a predetermined amount of time.

11. The system of claim 10, wherein the predetermined amount of time is configurable.

12. The system of claim 1, wherein:
the payload is coupled to the data bus by a remote interface unit,
the remote interface unit is configured to collect the telemetry data from the payload and provide the telemetry data to the processor, and
the remote interface unit is configured to receive commands from the processor and send the commands to the payload via a unidirectional link.

13. The system of claim 1, wherein:
the first command comprises:
a first portion of the first command which is in a first format,
a second portion of the first command which is in the first format,
the second command comprises:
a first portion of the second command which is in the first format
a second portion of the second command which is in a second format different from the first format, and
executing the second command comprises:
detecting the first portion of the second command within the second command, and
executing the first portion the second command.

14. The system of claim 1, wherein detecting the second command comprises:
detecting a predetermined preamble comprising a plurality of bits, and
detecting the second command based on the detected preamble.

15. A method for commanding a satellite, the method comprising:
receiving, with a processor, a first command from a primary receiver via a data bus;
receiving, by the processor, telemetry data from a payload via the data bus;
detecting, by the processor, a second command by processing the telemetry data received from the payload; and
executing, by the processor, the detected second command.

16. The method of claim 15, further comprising detecting, by the processor, an absence of commands from the primary receiver, wherein the second command is detected, by the processor, in response to the detecting the absence of commands from the primary receiver.

17. The method of claim 15, wherein processing the telemetry data, by the processor, to detect the second command comprises detecting changes in a parameter of the telemetry data received from the payload and interpreting detected changes as data bits.

18. The method of claim 15, wherein detecting the second command, by the processor, comprises detecting changes in the amount of power drawn by the payload.

19. The method of claim 15, wherein:
the second command comprises a plurality of data bits, each of the plurality of data bits corresponding to a distinct state of a parameter of the telemetry data, and
detecting the second command, by the processor, comprises detecting each of the plurality of data bits associated with the second command, the detecting each of the plurality of data bits comprising:
 detecting a first bit value in response to detecting a first state of the parameter of the telemetry data followed by detecting a different state of the parameter of the telemetry data corresponding to an idle state, and
 detecting a second bit value in response to detecting a second state of the parameter of the telemetry data followed by detecting the different state of the parameter of the telemetry data corresponding to the idle state.

20. The method of claim 15, wherein:
the second command comprises a plurality of symbols, each of the plurality of symbols corresponding to a distinct state of a parameter of the telemetry data, and
detecting the second command comprises detecting, by the processor, each of the plurality of symbols corresponding to the second command, the detecting each of the plurality of symbols comprising:
detecting the distinct state of the parameter of the telemetry data corresponding to the each of the plurality of symbols, followed by detecting a different state of the parameter of the telemetry data corresponding to an idle state.

21. The method of claim 15, wherein:
the payload is coupled to the data bus by a remote interface unit,
the remote interface unit is configured to collect the telemetry data from the payload and provide the telemetry data to the processor, and
the remote interface unit is configured to receive commands from the processor and send the commands to the payload via a unidirectional link.

22. The method of claim 15, wherein:
the first command comprises:
a first portion of the first command which is in a first format, a second portion of the first command which is in the first format, and the second command comprises:
a first portion of the second command which is in the first format
a second portion of the second command which is in a second format different from the first format, and executing the second command, by the processor, comprises:
detecting the first portion of the second command within the second command, and
executing the first portion the second command.

23. A non-transitory computer readable medium comprising computer executable instructions, which when executed by a processor cause the processor to carry out a method for commanding a satellite comprising:
receiving, by the processor, a first command from a primary receiver via a data bus;
receiving, by the processor, telemetry data from a payload via the data bus;
detecting, by the processor, a second command by processing the telemetry data received from the payload; and
executing, by the processor, the detected second command.

24. The non-transitory computer readable medium of claim 23, wherein the non-transitory computer readable medium comprises instructions, which when executed cause the processor to detect an absence of commands from the primary receiver, wherein the second command is detected, by the processor, in response to the detecting the absence of commands from the primary receiver.

25. The non-transitory computer readable medium of claim 23, wherein processing the telemetry data to detect the second command comprises detecting, by the processor, changes in a parameter of the telemetry data received from the payload and interpreting detected changes as data bits.

26. The non-transitory computer readable medium of claim 23, wherein detecting the second command comprises detecting, by the processor, changes in the amount of power drawn by the payload.

27. The non-transitory computer readable medium of claim 23, wherein:
the second command comprises a plurality of data bits, each of the plurality of data bits corresponding to a distinct state of a parameter of the telemetry data, and
detecting, by the processor, the second command comprises detecting each of the plurality of data bits associated with the second command, the detecting each of the plurality of data bits comprising:
detecting a first bit value in response to detecting a first state of the parameter of the telemetry data followed by detecting a different state of the parameter of the telemetry data corresponding to an idle state, and
detecting a second bit value in response to detecting a second state of the parameter of the telemetry data followed by detecting the different state of the parameter of the telemetry data corresponding to the idle state.

28. The non-transitory computer readable medium of claim 23, wherein:
the second command comprises a plurality of symbols, each of the plurality of symbols corresponding to a distinct state of a parameter of the telemetry data, and
detecting, by the processor, the second command comprises detecting each of the plurality of symbols corresponding to the second command, the detecting each of the plurality of symbols comprising:
detecting the distinct state of the parameter of the telemetry data corresponding to the each of the plurality of symbols, followed by detecting a different state of the parameter of the telemetry data corresponding to an idle state.

29. The non-transitory computer readable medium of claim 23, wherein:
the payload is coupled to the data bus by a remote interface unit,
the remote interface unit is configured to collect the telemetry data from the payload and provide the telemetry data to the processor, and
the remote interface unit is configured to receive commands from the processor and send the commands to the payload via a unidirectional link.

30. The non-transitory computer readable medium of claim 23, wherein:
the first command comprises:
a first portion of the first command which is in a first format,
a second portion of the first command which is in the first format,
the second command comprises:
a first portion of the second command which is in the first format
a second portion of the second command which is in a second format different from the first format, and
wherein the non-transitory computer readable medium comprises computer executable instructions, which when executed by the processor, cause the processor to execute the second command by:
detecting the first portion of the second command within the second command, and
executing the first portion the second command.

* * * * *